US012482491B2

(12) United States Patent
Matsunaga

(10) Patent No.: US 12,482,491 B2
(45) Date of Patent: Nov. 25, 2025

(54) METHOD OF MANUFACTURING DISK DEVICE, AND DISK DEVICE

(71) Applicants:KABUSHIKI KAISHA TOSHIBA, Tokyo (JP); TOSHIBA ELECTRONIC DEVICES & STORAGE CORPORATION, Tokyo (JP)

(72) Inventor: Toshitaka Matsunaga, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/809,210

(22) Filed: Aug. 19, 2024

(65) Prior Publication Data
US 2025/0292795 A1 Sep. 18, 2025

(30) Foreign Application Priority Data
Mar. 15, 2024 (JP) .................. 2024-040859

(51) Int. Cl.
| | | |
|---|---|---|
| G11B 5/54 | (2006.01) | |
| G11B 5/024 | (2006.01) | |
| G11B 5/55 | (2006.01) | |
| G11B 5/596 | (2006.01) | |
| G11B 5/84 | (2006.01) | |

(52) U.S. Cl.
CPC .......... *G11B 5/59666* (2013.01); *G11B 5/024* (2013.01); *G11B 5/59661* (2013.01); *G11B 5/84* (2013.01)

(58) Field of Classification Search
CPC . G11B 5/743; G11B 5/59661; G11B 5/59627; G11B 5/5543; G11B 5/5534; G11B 5/54; G11B 5/58
USPC ......................................................... 360/75
See application file for complete search history.

(56) References Cited

U.S. PATENT DOCUMENTS

| | | |
|---|---|---|
| 6,493,176 B1 | 12/2002 | Deng et al. |
| 6,692,852 B2 | 2/2004 | Yang |
| 7,054,090 B2 | 5/2006 | Ikeda et al. |
| 7,852,592 B1 * | 12/2010 | Liang ................. G11B 5/59627 360/75 |
| 8,514,510 B1 | 8/2013 | Sutardja |
| 9,064,517 B1 * | 6/2015 | Neos ..................... G11B 5/596 |
| 9,076,490 B1 | 7/2015 | Nie et al. |
| 2012/0229930 A1 | 9/2012 | Wang et al. |

\* cited by examiner

*Primary Examiner* — Nabil Z Hindi
(74) *Attorney, Agent, or Firm* — Knobbe, Martens, Olson & Bear, LLP

(57) ABSTRACT

According to one embodiment, there is provided a method of manufacturing a disk device. The method includes acquiring information on a write width of a head. The method includes adjusting a seek speed of the head at a time of writing a spiral pattern to a disk according to the acquired write width.

20 Claims, 18 Drawing Sheets

METHOD OF MANUFACTURING DISK DEVICE, AND DISK DEVICE

CROSS-REFERENCE TO RELATED APPLICATIONS

This application is based upon and claims the benefit of priority from Japanese Patent Application No. 2024-040859, filed on Mar. 15, 2024; the entire contents of which are incorporated herein by reference.

FIELD

Embodiments described herein relate generally to a method of manufacturing a disk device, and a disk device.

BACKGROUND

A disk device may be manufactured through a self-servo write step. In the self-servo write step, a spiral pattern is written on a disk, and a servo pattern is written with reference to the spiral pattern. In order to reduce a manufacturing cost of a disk device, it is desired to improve a yield of the self-servo write step.

DETAILED DESCRIPTION

In general, according to one embodiment, there is provided a method of manufacturing a disk device. The method includes acquiring information on a write width of a head. The method includes adjusting a seek speed of the head at a time of writing a spiral pattern to a disk according to the acquired write width.

Exemplary embodiments of a method of manufacturing a disk device will be explained below in detail with reference to the accompanying drawings. The present invention is not limited to the following embodiments.

Embodiment

Figure 1:
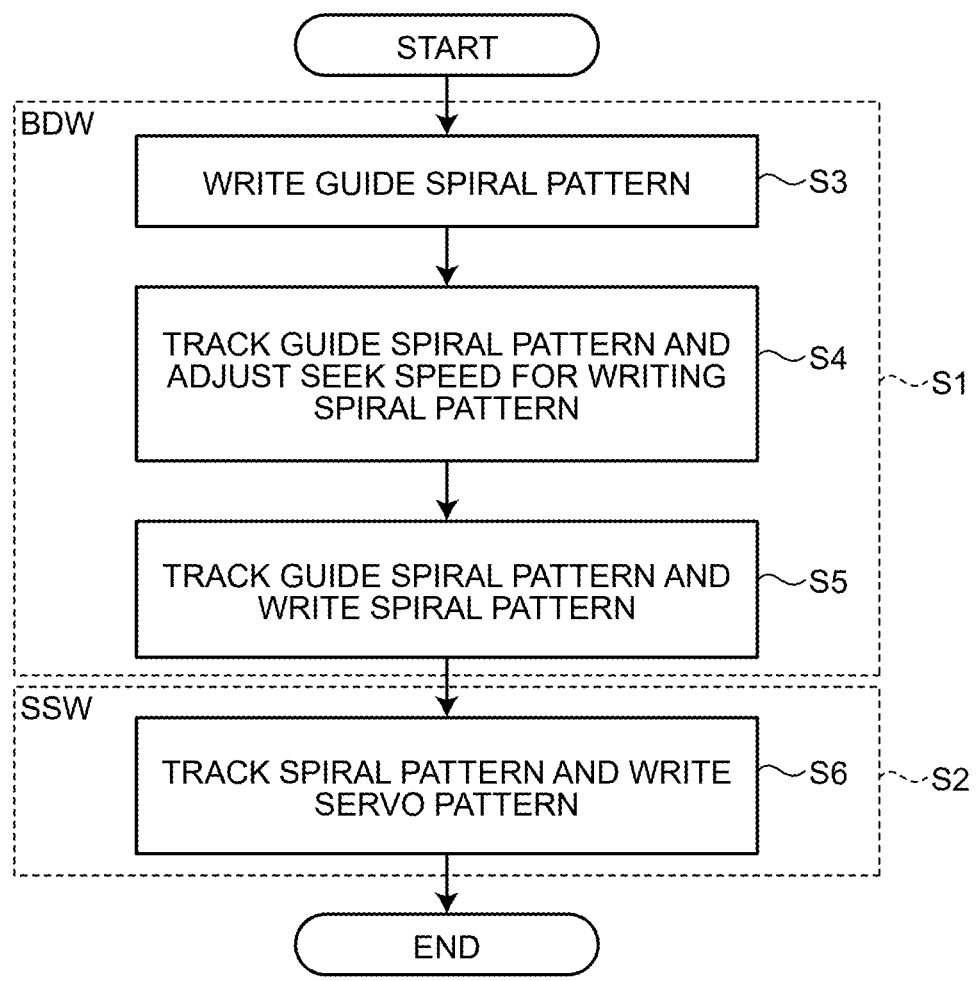
FIG. 1 is a flowchart illustrating a method of manufacturing a disk device according to an embodiment.

While the method of manufacturing a disk device according to the embodiment includes a self-servo write step, the method is devised for improving a yield of the self-servo write step. For example, as illustrated in FIG. 1, the method of manufacturing a disk device 1 includes a blank disk write (BDW) step and a self-servo write (SSW) step. FIG. 1 is a flowchart illustrating the method of manufacturing the disk device 1.

In the BDW step (S1), a guide spiral pattern is written on a blank disk, and a spiral pattern is written on the disk using the written guide spiral pattern. In the SSW step (S2), a servo pattern is written on the disk using the written spiral pattern. The spiral pattern is also called a final spiral pattern. The servo pattern is also called a product servo pattern.

Figure 2:
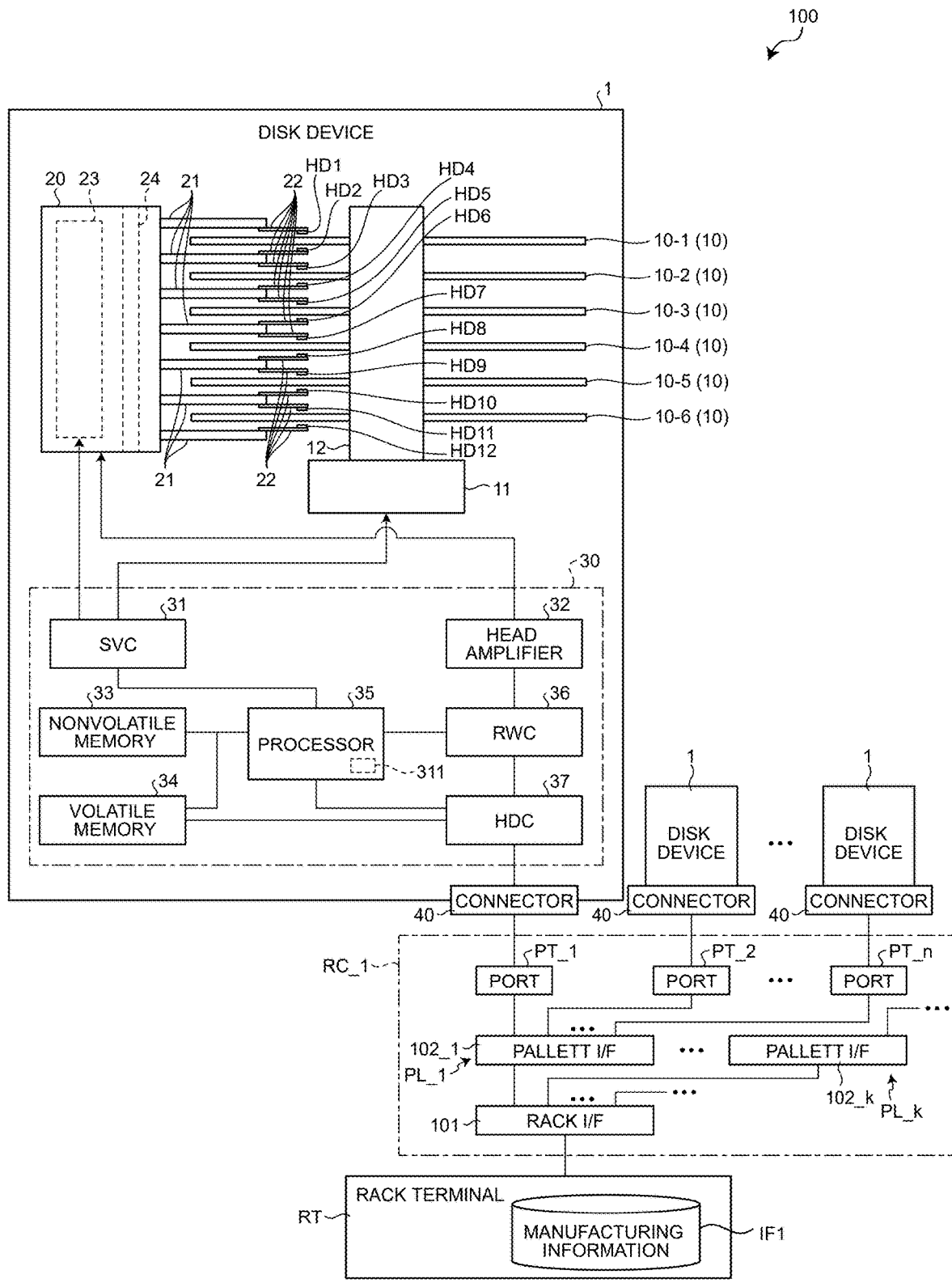
FIG. 2 is a diagram illustrating a configuration of the disk device according to the embodiment.

In the BDW step (S1), the disk device 1 as illustrated in FIG. 2 is prepared. FIG. 2 is a diagram illustrating a configuration of the disk device 1.

The disk device 1 is connected to a port PT of a manufacturing rack RC in a manufacturing system 100, and is communicable with a rack terminal RT via the manufacturing rack RC. The manufacturing system 100 may include multiple manufacturing racks RC. Each manufacturing rack RC includes a rack interface (rack I/F) 101 and multiple pallets PL_1 to PL_k. k is an integer of two or more. Each of the pallets PL_1 to PL_k has a pallet interface (pallet I/F) 102 and multiple ports PT_1 to PT_n. n is an integer of two or more. Each port PL is connected to a connector 40 of the disk device 1.

Although the disk device 1 is connected to the port PT in a manufacturing step, the disk device can be connected to a host 2 after completion of the manufacturing step. Standards for a communication path between the disk device 1 and the host 2 are not limited to a specific standard. In one example, serial advanced technology attachment (SATA) or serial attached SCSI (SAS) can be adopted. The connector 40 may include a SATA connector or a universal asynchronous receiver/transmitter (UART) connector. The disk device 1 functions as a storage medium of the host 2. The disk device 1 is, for example, a disk-type storage medium such as a hard disk drive (HDD) or an optical disk drive.

The host 2 corresponds to, for example, a processor, a personal computer, a server, or the like. The disk device 1 can receive an access command (e.g., a read command and a write command) from the host 2.

The disk device 1 includes multiple disks 10 that rotate about a rotation shaft 12 of a spindle motor (SPM) 11. Here, as an example, the disk device 1 includes six disks 10-1, 10-2, 10-3, 10-4, 10-5, and 10-6. The six disks 10-1, 10-2, 10-3, 10-4, 10-5, and 10-6 are integrally rotated by the SPM 11.

The disk 10 is a substantially disc-shaped medium on which information is to be recorded. The disk 10 may be a magnetic disk or a magneto-optical disk. In a case where the disk 10 is a magnetic disk, recording surfaces on which data can be recorded are formed on front surfaces and back surfaces of the six disks 10. In other words, the six disks 10 have 12 recording surfaces. In order to access each of the 12 recording surfaces, the disk device 1 includes 12 heads HD1 to HD12 corresponding to the 12 recording surfaces.

The head HD1 is provided so as to be opposed to the front surface of the disk 10-1. The head HD2 is provided so as to be opposed to the back surface of the disk 10-1. The head HD3 is provided so as to be opposed to the front surface of the disk 10-2. The head HD4 is provided so as to be opposed to the back surface of the disk 10-2. The head HD5 is provided so as to be opposed to the front surface of the disk 10-3. The head HD6 is provided so as to be opposed to the back surface of the disk 10-3. The head HD7 is provided so as to be opposed to the front surface of the disk 10-4. The head HD8 is provided so as to be opposed to the back surface of the disk 10-4. The head HD9 is provided so as to be opposed to the front surface of the disk 10-5. The head HD10 is provided so as to be opposed to the back surface of the disk 10-5. The head HD11 is provided so as to be opposed to the front surface of the disk 10-6. The head HD12 is provided so as to be opposed to the back surface of the disk 10-6.

Hereinafter, the 12 heads HD1 to HD12 may be collectively referred to as the head HD. Each head HD can access, i.e., execute write of information and read of data to and from a recording surface provided on a surface of the six disks 10 opposed to the head. Each head HD includes a write element WE and a read element RE, writes information on the disk 10 by the write element WE, and reads information from the disk 10 by the read element RE.

The disk device 1 includes an actuator system 20 that integrally moves the 12 heads HD. The actuator system 20 includes seven actuator arms 21, 12 suspensions 22, and a voice coil motor (VCM) 23. Each of the 12 suspensions 22 included in the actuator system 20 supports any one of the heads HD1 to HD12. Each of the 12 suspensions 22 included in the actuator system 20 is attached to a distal end of any one of the seven actuator arms 21.

The actuator system 20 is rotatable about a rotation shaft 24. The rotation shaft 24 is provided at a position parallel to the rotation shaft 12 and separated from the rotation shaft 12. The VCM 23 can rotate the actuator system 20 within a predetermined range about the rotation shaft 24. Therefore, the actuator system 20 can move the heads HD1 to HD12 in a radial direction with respect to the recording surfaces of the disks 10-1 to 10-6.

The disk device 1 further includes a servo controller (SVC) 31, a head amplifier 32, a nonvolatile memory 33, a volatile memory 34, a processor 35, a read/write channel (RWC) 36, and a hard disk controller (HDC) 37.

The head amplifier 32 supplies a signal corresponding to write data input from the RWC 36 to the head HD opposed to a recording surface to be written. Furthermore, the head amplifier 32 amplifies a signal output from the head HD opposed a recording surface to be read, and supplies the amplified signal to the RWC 36.

The nonvolatile memory 33 is, for example, a flash memory or the like. A program to be executed by the processor 35 is recorded in the nonvolatile memory 33. In the manufacturing step of the disk device 1, the program to be executed by the processor 35 includes a BDW program, an SSW program, and the like. The program to be executed by the processor 35 after completion of the manufacturing step of the disk device 1 includes firmware for normal operation and the like.

The volatile memory 34 is configured with a volatile memory such as a dynamic random access memory (DRAM) or a static random access memory (SRAM). The volatile memory 34 is provided with a region for buffering write data that is received from the host 2 and before being written to the disk 10 and read data that is read from the disk 10 and before being sent to the host 2.

The RWC 36 modulates write data buffered in the volatile memory 34 and outputs the modulated write data to the head amplifier 32. In addition, the RWC 36 demodulates the signal supplied from the head amplifier 32 and outputs the demodulated signal to the HDC 37.

In the manufacturing step of the disk device 1, the HDC 37 is a communication interface that enables communication with the port PT. Specifically, the HDC 37 can transmit a predetermined request to the rack terminal RT via the port PT, the pallet I/F 102, and the rack I/F 101. Upon receiving the predetermined request, the rack terminal RT transmits response information in response to the predetermined request. The HDC 37 receives the response information from the rack terminal RT via the rack I/F 101, the pallet I/F 102, and the port PT.

After the completion of the manufacturing step of the disk device 1, the HDC 37 is a communication interface that enables communication with the host 2. Specifically, upon receiving a write command from the host 2, the HDC 37 stores write data in the volatile memory 34, and returns a response to the host 2 when writing of the write data to the disk 10 is completed. In addition, in a case where a read command is received from the host 2, after data (read data) requested to be read by the read command is read from the disk 10 and buffered in the volatile memory 34, the HDC 37 returns the buffered read data to the host 2 34.

The SVC 31 supplies a control signal to the SPM 11 to rotate the SPM 11 at predetermined frequency and phase. The control signal may be a control current or a control voltage.

The SVC 31 also drives the VCM 23 to move the head HD to a position designated by the processor 35.

The processor 35 is, for example, a central processing unit (CPU). The processor 35 executes various processing by a program stored in a nonvolatile storage medium such as the nonvolatile memory 33 or the disk 10.

For example, the processor 35 executes control of data writing and data reading by the head HD, processing of deciding an access position on the recording surface of the disk 10, processing of instructing the servo controller 31 on the access position, and the like.

The servo controller 31, the head amplifier 32, the nonvolatile memory 33, the volatile memory 34, the processor 35, the RWC 36, and the HDC 37 constitute a controller 30. Note that the components of the controller 30 are not limited thereto.

Returning to FIG. 1, in the BDW step (S1), the disk device 1 writes the guide spiral pattern 11 on the blank disk 10 (S3).

Figure 3:
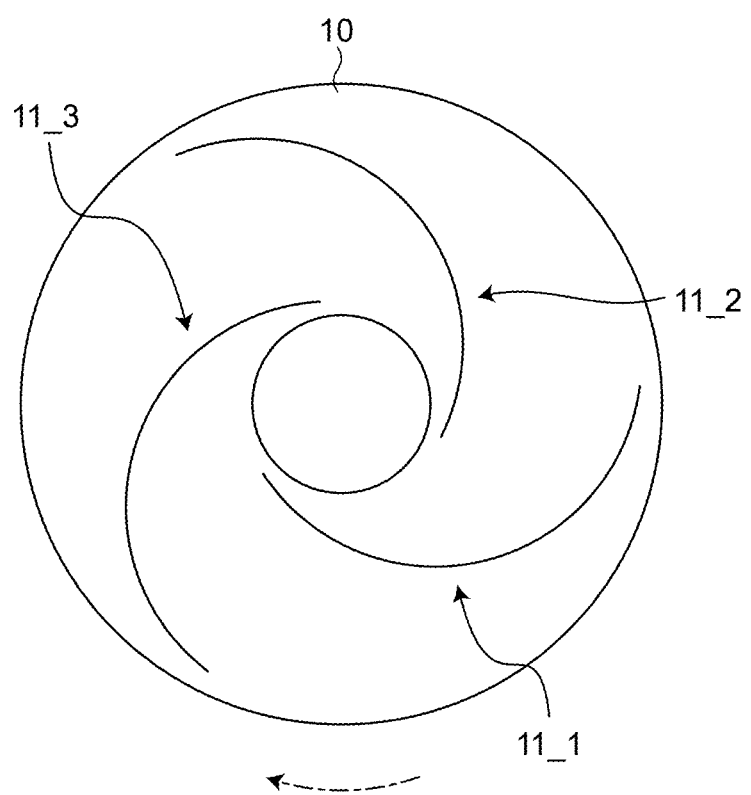
FIG. 3 is a diagram illustrating arrangement of a guide spiral pattern on a disk according to the embodiment.

The disk device 1 may write multiple guide spiral patterns 11_1 to 11_3 as illustrated in FIG. 3 on the recording surface of the corresponding disk 10 by any head HD of the multiple heads HD1 to HD12. FIG. 3 is a diagram illustrating arrangement of the guide spiral pattern 11 on the disk 10. In FIG. 3, a rotation direction of the disk 10 is indicated by a dashed line arrow. Each guide spiral pattern 11 spirally extends from an inner peripheral side to an outer peripheral side of the disk 10. While FIG. 3 illustrates the case where three guide spiral patterns 11_1 to 11_3 are written, the number of guide spiral patterns 11 may be one to two or four or more.

The disk device 1 rotates the disk 10 at a predetermined rotation speed, and positioning-controls the head HD at a first position on the inner peripheral side according to the predetermined rotation speed. The disk device 1 moves (seeks) the head HD from the inner peripheral side to the outer peripheral side of the disk 10 up to a target position on the disk 10 at a predetermined seek speed while rotating the disk 10 at the predetermined rotation speed, and writes control information IF2 with the write element WE.

Figure 4:
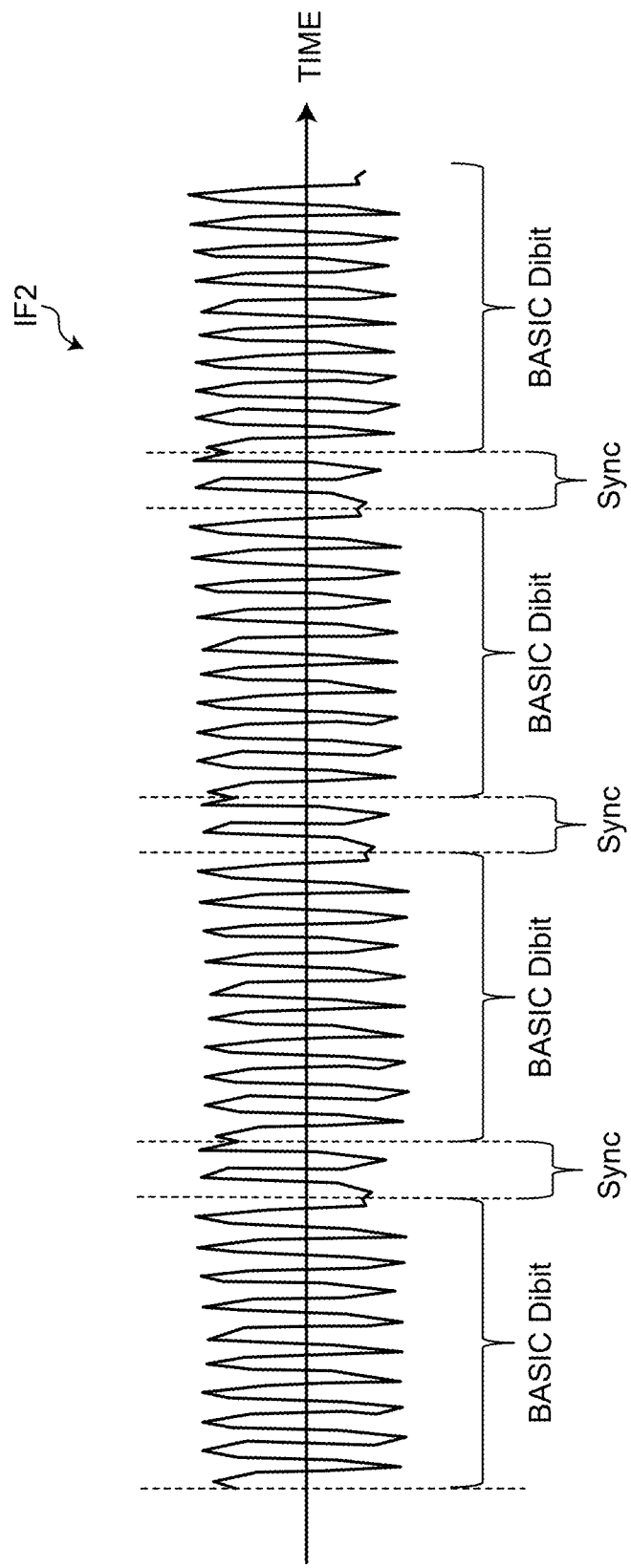
FIG. 4 is a diagram illustrating a format of control information according to the embodiment.

The disk device 1 may write the control information IF2 as illustrated in FIG. 4 to the disk 10. FIG. 4 is a diagram illustrating a format of the control information IF2. The control information IF2 includes sync marks at a predetermined frequency and includes basic Dibit between the sync marks. The Sync mark is used for adjusting the seek speed to be described later. The basic Dibit is used for adjusting an amplitude of a read signal.

The disk device 1 writes the control information IF2 in a spiral shape on the disk 10. As a result, the guide spiral pattern 11_1 is written on the disk 10.

Similarly, the disk device 1 positioning-controls the head HD at a second position on the inner peripheral side according to the predetermined rotation speed. The second position is shifted from the first position by a predetermined amount in a circumferential direction. The disk device 1 seeks the head HD from the inner peripheral side to the outer peripheral side of the disk 10 at the predetermined seek speed while rotating the disk 10 at the predetermined rotation speed, and writes the control information IF2 with the write element WE. As a result, the guide spiral pattern 11_2 is written on the disk 10.

The disk device 1 positioning-controls the head HD at a third position on the inner peripheral side according to the predetermined rotation speed. The third position is shifted from the second position by a predetermined amount in the circumferential direction. The disk device 1 seeks the head HD from the inner peripheral side to the outer peripheral side of the disk 10 at the predetermined seek speed while rotating the disk 10 at the predetermined rotation speed, and writes the control information IF2 with the write element WE. As a result, the guide spiral pattern 11_3 is written on the disk 10.

In the BDW step (S1), the disk device 1 tracks the guide spiral pattern 11 and performs adjustment processing of adjusting a seek speed for writing the spiral pattern 22 (S4).

Figure 5:
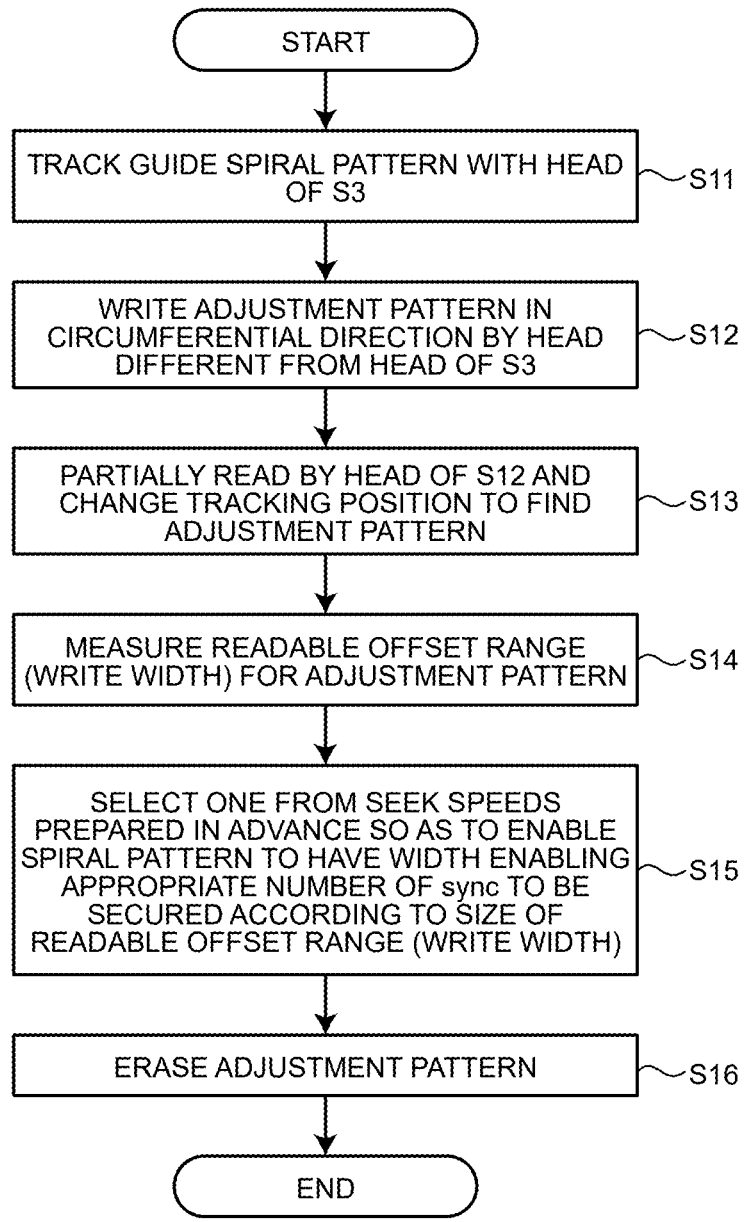
FIG. 5 is a flowchart illustrating adjustment processing according to the embodiment.

In S4, processing of S11 to S16 illustrated in FIG. 5 is performed. FIG. 5 is a flowchart illustrating the adjustment processing (S4).

In S11, the disk device 1 tracks the guide spiral pattern 11 with the head HD of S3. The disk device 1 performs positioning-control of the head HD at a predetermined cylinder on the inner peripheral side according to information read from the guide spiral pattern 11 by the head HD of S3, and tracks the predetermined cylinder.

In S12, the disk device 1 writes the adjustment pattern 12 in the circumferential direction by a head HD different from the head HD of S3 (S12).

Figure 6:
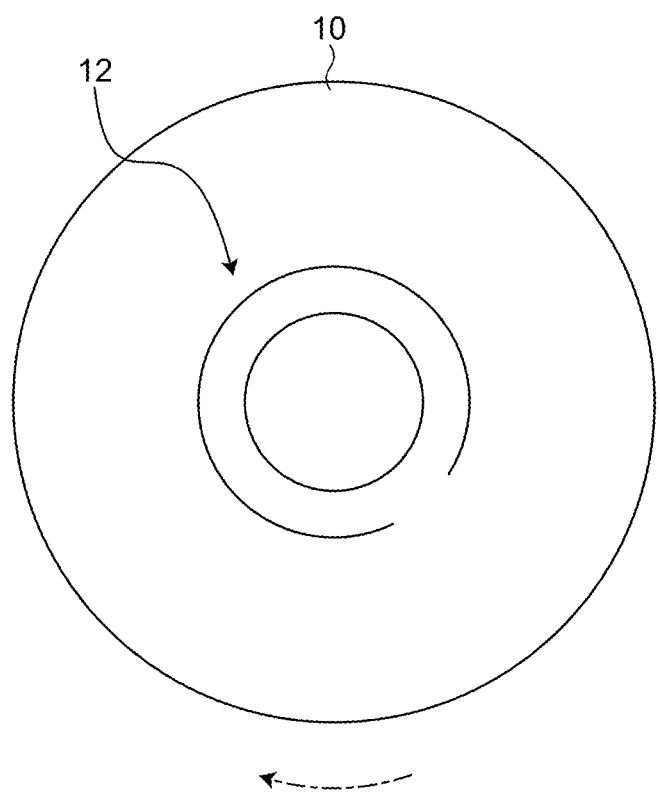
FIG. 6 is a diagram illustrating arrangement of an adjustment pattern on the disk according to the embodiment.

The disk device 1 may write the adjustment pattern 12 as illustrated in FIG. 6 to the disk 10 by a head HD different from the head HD of S3 among the multiple heads HD1 to HD12. FIG. 6 is a diagram illustrating arrangement of the adjustment pattern 12 on the disk 10. In FIG. 6, the adjustment pattern 12 extending in a circular shape partially missing in the circumferential direction of the disk 10 is illustrated. In FIG. 6, the rotation direction of the disk 10 is indicated by a dashed line.

The disk device 1 rotates the disk 10 at the predetermined rotation speed, and performs positioning-control of the head HD at a fourth position on the inner peripheral side according to the information read from the guide spiral pattern 11. The fourth position may be a position slightly on the outer peripheral side of an innermost peripheral position of the disk 10. While rotating the disk 10 at the predetermined rotation speed, the disk device 1 writes the control information IF2 with the write element WE without causing the head HD to seek.

Figure 7:
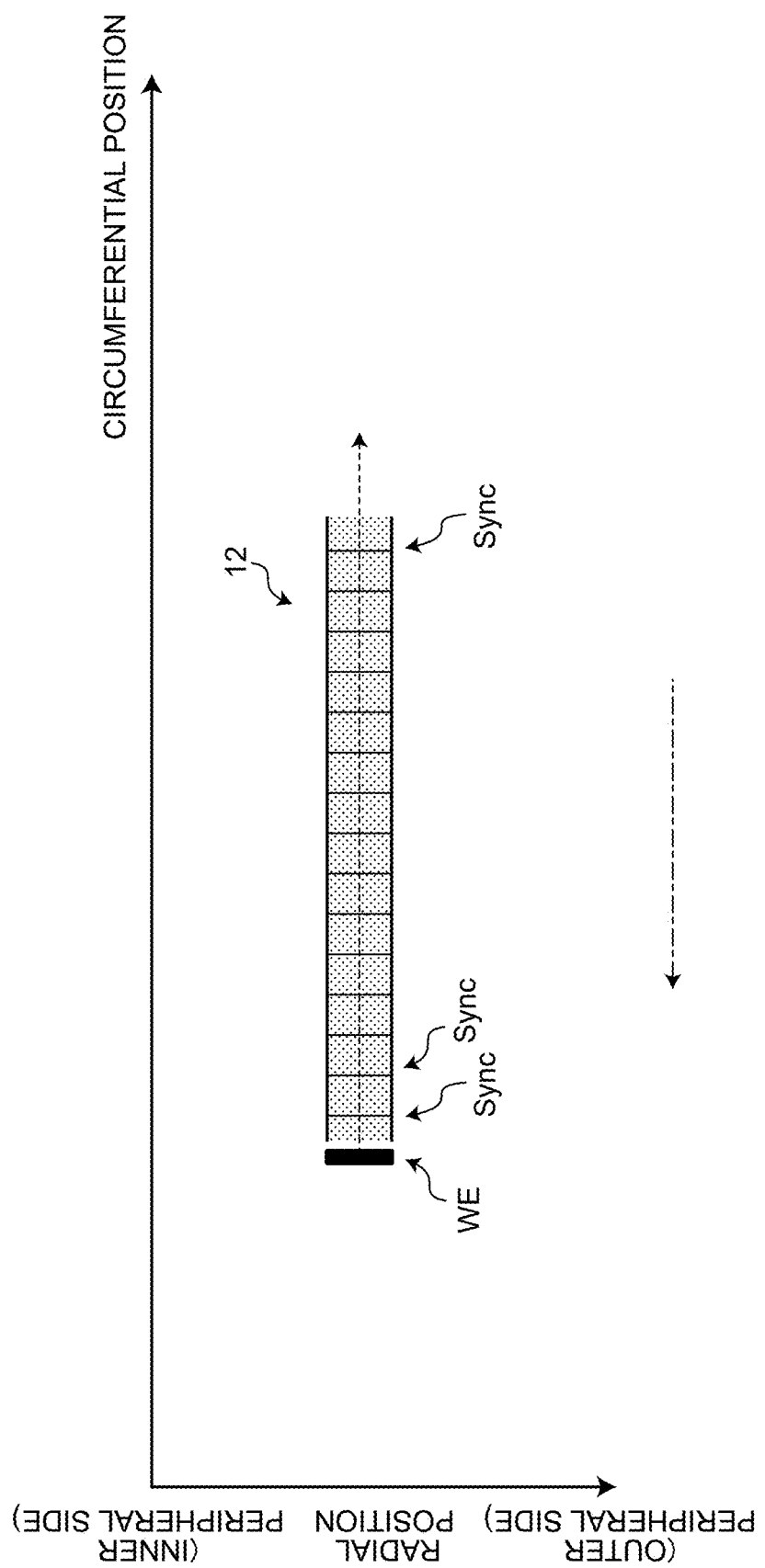
FIG. 7 is a diagram illustrating a configuration of the adjustment pattern according to the embodiment.

The disk device 1 performs positioning-control of the head HD at the fourth position, and writes the control information IF2 (see FIG. 4) in the circumferential direction on the disk 10. The disk device 1 may write the control information IF2 in the circumferential direction such that a write range of the control information IF2 becomes shorter than one round. As a result, as illustrated in FIG. 7, the adjustment pattern 12 is written on the disk 10. FIG. 7 is a diagram illustrating a configuration of the adjustment pattern 12. In FIG. 7, the vertical axis represents a radial position, and the horizontal axis represents a circumferential position. In FIG. 7, the rotation direction of the disk 10 is indicated by a dashed line arrow, and a direction in which the write element WE advances relative to the disk 10 is indicated by a dotted line arrow.

Note that a cycle of the Sync mark in the adjustment pattern 12 may be substantially equal to a cycle of the Sync mark in the guide spiral pattern 11. A format of the adjustment pattern 12 may be equivalent to a format of the guide spiral pattern 11.

In S13, the disk device 1 partially reads by the head HD of S12, and changes a tracking position to find the adjustment pattern 12. The disk device 1 performs partial reading with the read element RE of the head HD of S12 while tracking the guide spiral pattern 11, and finds the adjustment pattern 12 while changing a cylinder to be tracked. A width of a read time can be set to a time width in which a read gate becomes an active level. The time width in which the read gate becomes the active level is set, for example, to be within a range in which a predetermined number or more of Sync can be continuously detected. The predetermined number corresponds to a maximum amplitude of the read signal, and may be, for example, ten. The number of times of reading is, for example, ten to 30 per rotation.

In S14, a readable offset range (=write width) is measured for the adjustment pattern 12 found in S13. The readable offset range can be also referred to as a radial position range in which the adjustment pattern 12 can be read. Whether reading is possible or not is determined, for example, when the number of Sync detected is at a slice level or more on average. The slice level is a number between zero and a predetermined number, and may be, for example, five.

For example, the disk device 1 performs positioning-control of the read element RE of the head HD at a radial position with an offset amount SA0 (see FIG. 11) in the radial direction from a track center TC. The offset amount SA0 corresponds to the read element RE passing through a radially inner side of the adjustment pattern 12. In the disk device 1, the adjustment pattern 12 is read by the read element RE. Since a level of a read signal obtained as a result of passing through the radially inner side of the adjustment pattern 12 is substantially zero, the number of Sync in the read signal is detected to be substantially zero.

Figure 8:
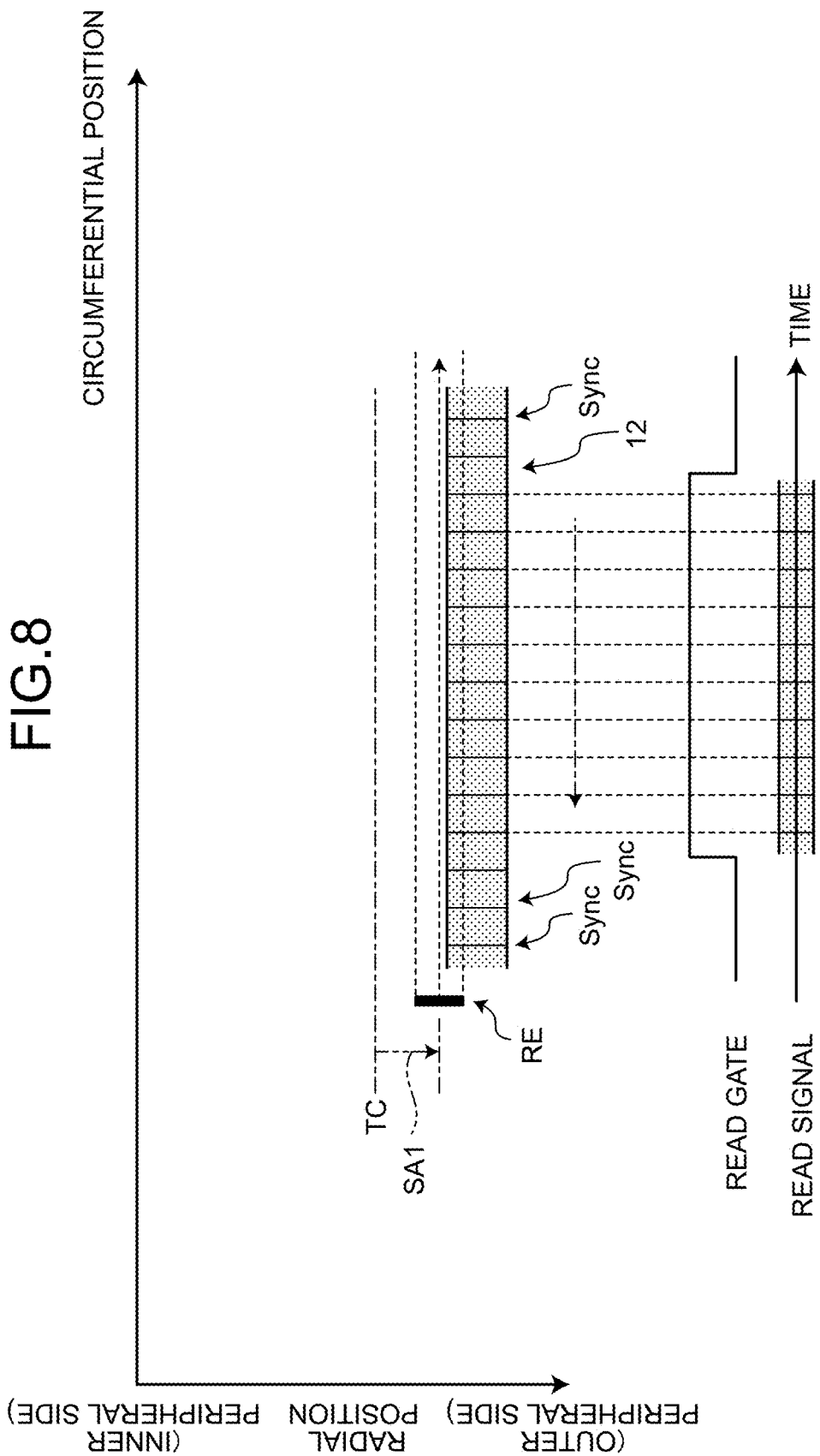
FIG. 8 is a diagram illustrating a read signal of the adjustment pattern with respect to an offset amount SA1 according to the embodiment.

The disk device 1 performs positioning-control of the read element RE of the head HD at a radial position with an offset amount SA1 in the radial direction from the track center TC as illustrated in FIG. 8. FIG. 8 is a diagram illustrating a read signal of the adjustment pattern 12 with respect to the offset amount SA1. The offset amount SA1 is larger than the offset amount SA0 and corresponds to the read element RE passing through the vicinity of an inner peripheral side edge of the adjustment pattern 12. In the disk device 1, when the adjustment pattern 12 is read by the read element RE, as illustrated in FIG. 8, an obtained read signal has a predetermined amplitude or more in a +− direction, and the number of Sync in the read signal is detected to be at the slice level or more (e.g., ten).

Figure 9:
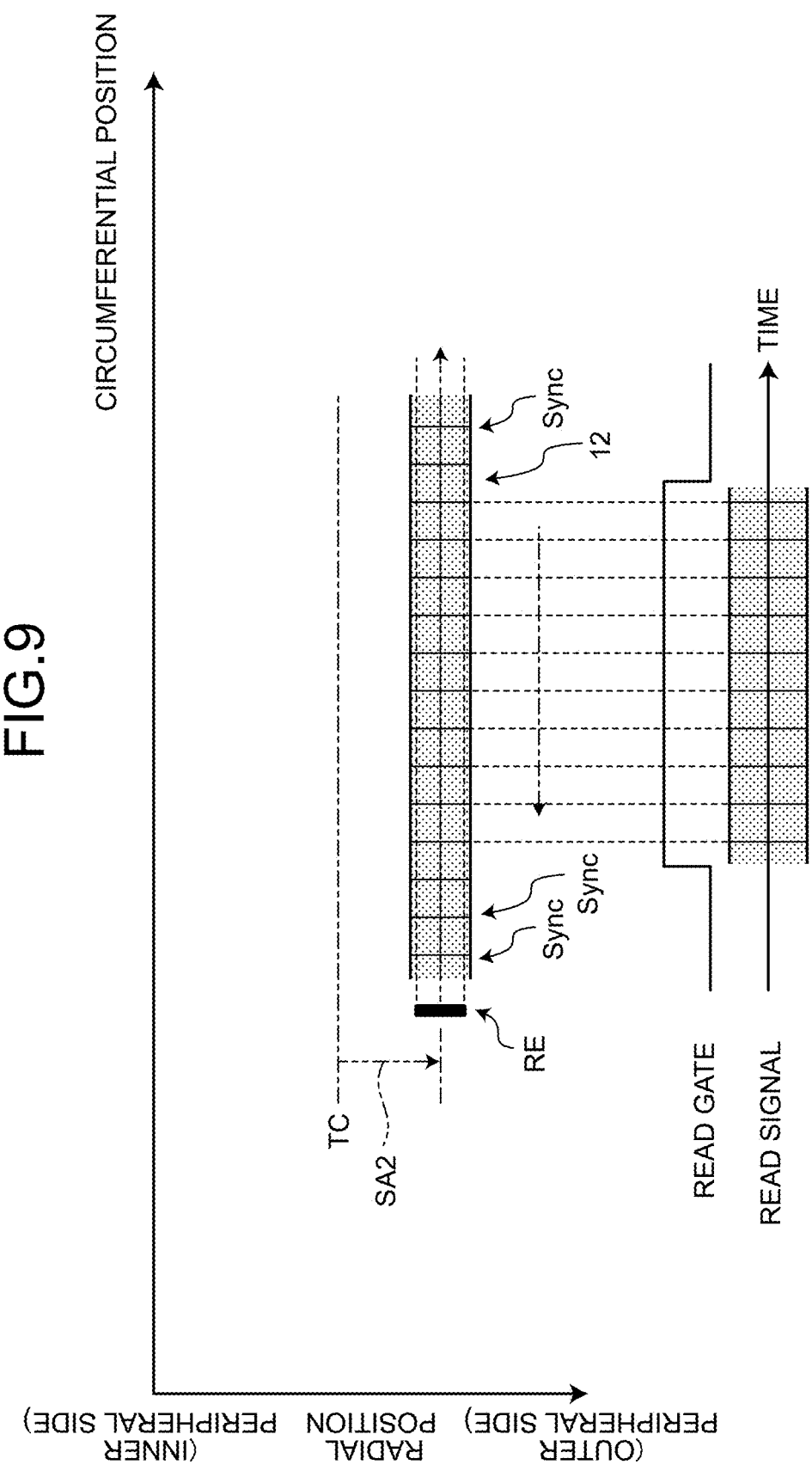
FIG. 9 is a diagram illustrating a read signal of the adjustment pattern with respect to an offset amount SA2 according to the embodiment.

The disk device 1 performs positioning-control of the read element RE of the head HD at a radial position with an offset amount SA2 in the radial direction from the track center TC as illustrated in FIG. 9. FIG. 9 is a diagram illustrating a read signal of the adjustment pattern 12 with respect to the offset amount SA2. The offset amount SA2 is larger than the offset amount SA1 and corresponds to the read element RE passing through the vicinity of the center of the adjustment pattern 12. In the disk device 1, when the adjustment pattern 12 is read by the read element RE, as illustrated in FIG. 9, an obtained read signal has a predetermined amplitude or more in the +− direction, and the number of Sync in the read signal is detected to be at the slice level or more (e.g., ten).

Figure 10:
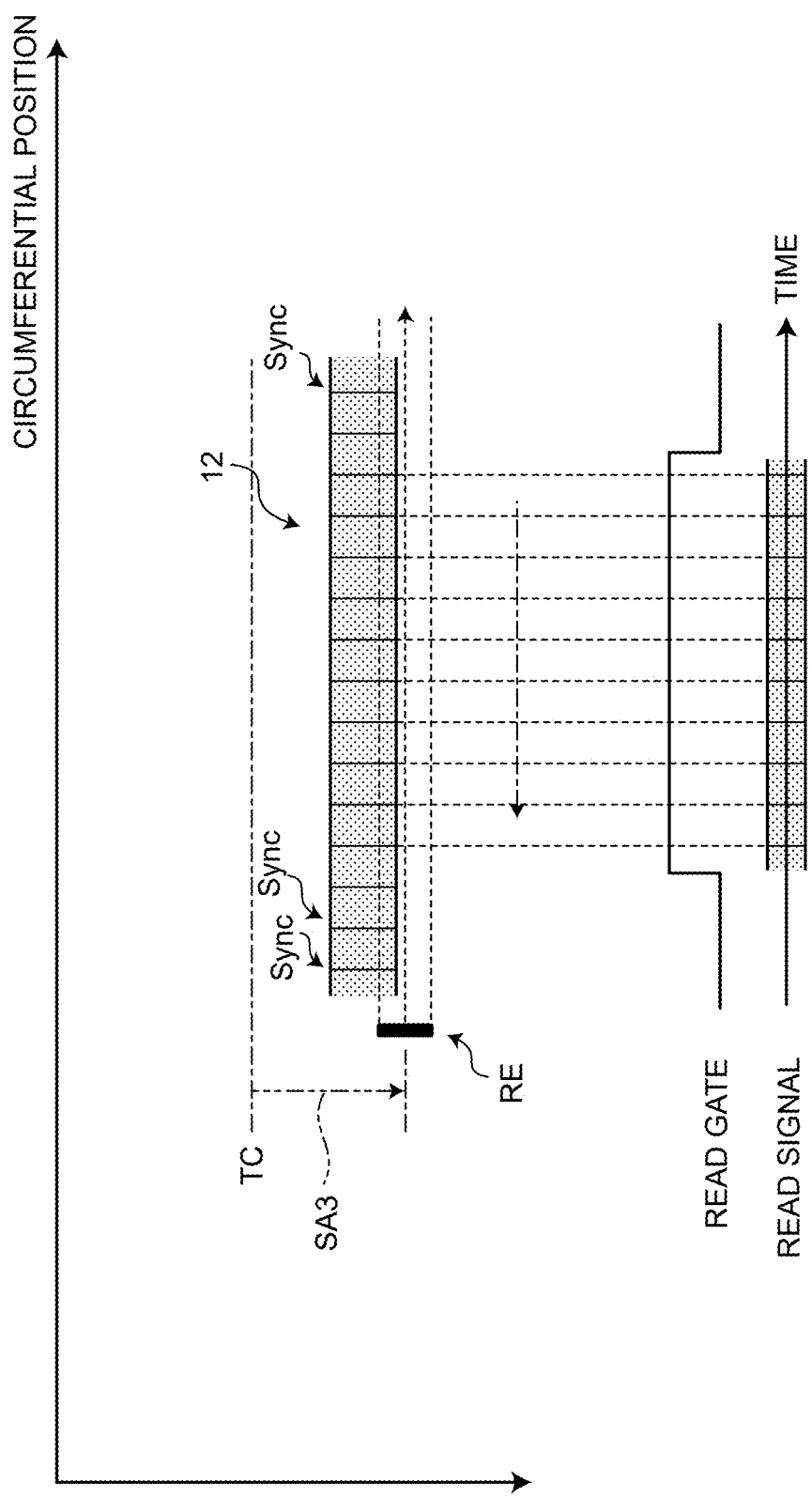
FIG. 10 is a diagram illustrating a read signal of the adjustment pattern with respect to an offset amount SA3 according to the embodiment.

The disk device 1 performs positioning-control of the read element RE of the head HD at a radial position with an offset amount SA3 in the radial direction from the track center TC as illustrated in FIG. 10. FIG. 10 is a diagram illustrating a read signal of the adjustment pattern 12 with respect to the offset amount SA3. The offset amount SA3 is larger than the offset amount SA2 and corresponds to the read element RE passing through the vicinity of an outer peripheral side edge of the adjustment pattern 12. In the disk device 1, when the adjustment pattern 12 is read by the read element RE, as illustrated in FIG. 10, an obtained read signal has a predetermined amplitude or more in the +− direction, and the number of Sync in the read signal is detected to be at the slice level or more (e.g., ten).

The disk device 1 performs positioning-control of the read element RE of the head HD at a radial position with an offset amount SA4 (see FIG. 11) in the radial direction from the track center TC. The offset amount SA4 corresponds to the read element RE passing through a radially outer side of the adjustment pattern 12. In the disk device 1, the adjustment pattern 12 is read by the read element RE. Since a level of the read signal obtained as a result of passing through the radially outer side of the adjustment pattern 12 is substantially zero, the number of Sync in the read signal is detected to be substantially zero.

Figure 11:
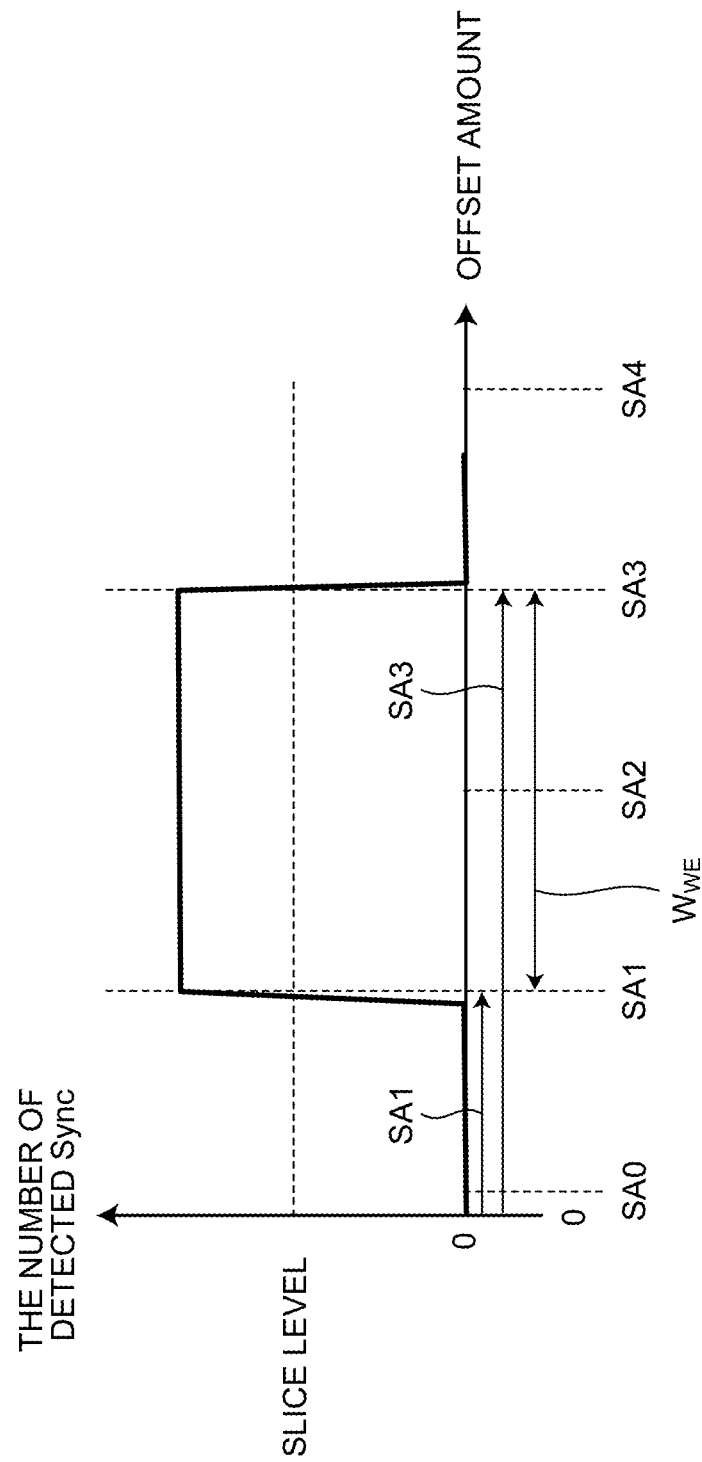
FIG. 11 is a diagram illustrating how to obtain a write width according to the embodiment.

As illustrated in FIG. 11, the readable offset range (=write width) can be obtained according to the measurement results illustrated in FIGS. 8 to 10. FIG. 11 is a diagram illustrating how to obtain a write width.

Whether reading is possible or not is determined, for example, when the number of Sync detected is at the slice level (e.g. five) or more on average. For measurement of the readable offset range, the offset amount from a reference position is given in increments of a predetermined width (e.g., 1/20 of a track width) to measure whether or not the adjustment pattern 12 can be read. An offset range (=write width $W_{WE}$) is calculated from a difference between a maximum value and a minimum value of the readable offset amount. The write width $W_{WE}$ corresponds to a radial width of the write element WE. In the case of FIG. 11, the maximum value and the minimum value of the readable offset amount are SA3 and SA1, respectively, and the write width $W_{WE}$ of the head HD can be obtained by the following Formula 1.

$$W_{WE} = SR3 - SA1 \qquad \text{Formula 1}$$

In S15, the disk device 1 selects one from the multiple seek speeds prepared in advance so as to enable the spiral pattern 13 (see FIG. 17) to have a width enabling an appropriate number of syncs to be secured according to a size of the write width $W_{WE}$. The appropriate number of Sync is the number of Sync that enables positioning-control of the head HD with required accuracy, and can be at the slice level (e.g., five) or more. The disk device 1 may select the highest seek speed among seek speeds at which the number of Sync is at the slice level or more according to the size of the write width $W_{WE}$ among the multiple seek speeds.

A width of the spiral pattern 13 in the circumferential direction that can secure an appropriate number of Sync is obtained by calculating one frame length (for one Sync) of the spiral pattern 13×the appropriate number of Sync. Hereinafter, a width of the spiral pattern 13 in the circumferential direction corresponding to twice the write width $W_{WE}$ will be referred to as a spiral width SP.

Figure 12:
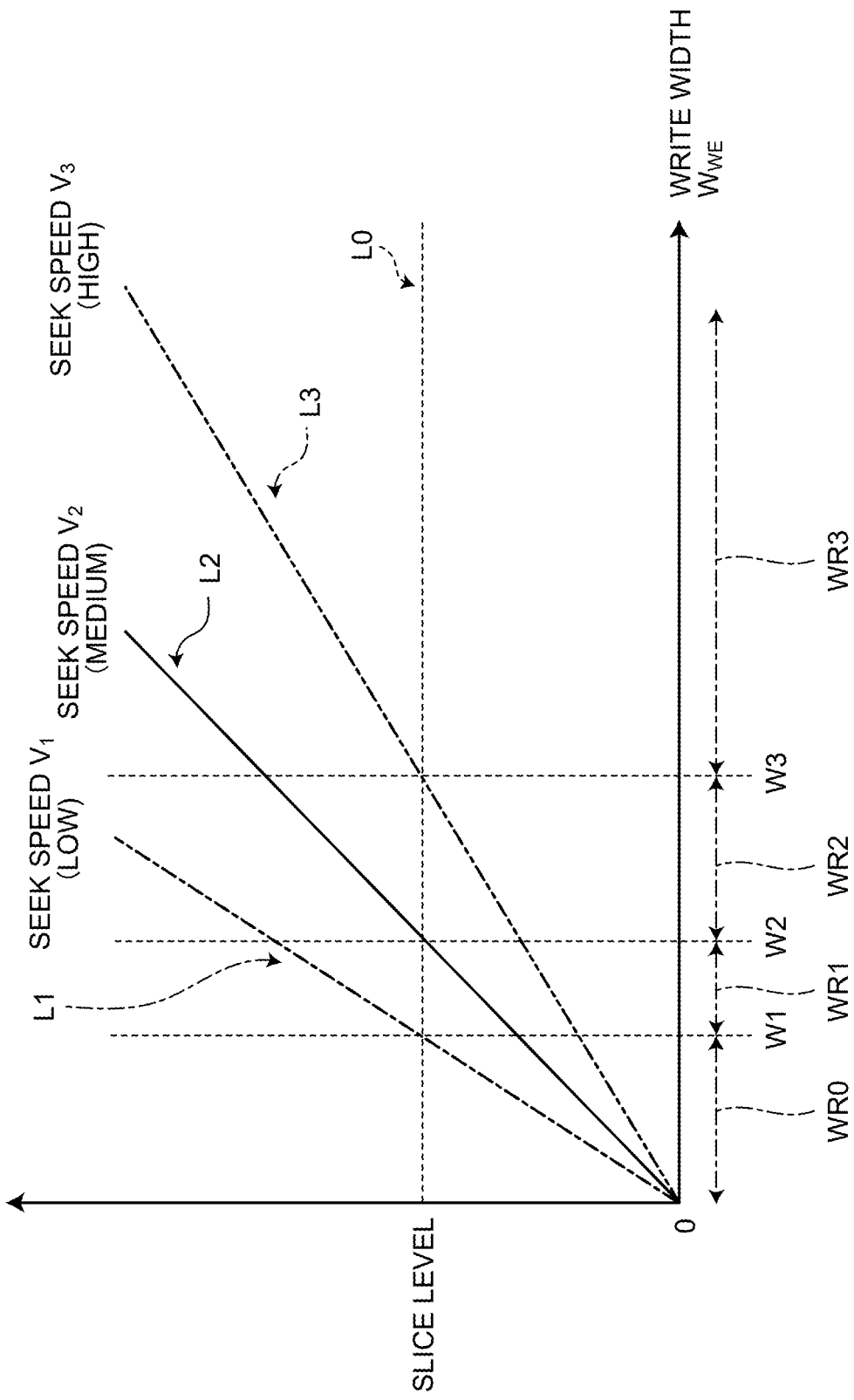
FIG. 12 is a diagram illustrating how to decide a seek speed according to the embodiment.

The multiple seek speeds as selection candidates and write widths corresponding thereto can be experimentally decided in advance. As illustrated in FIG. 12, at a certain seek speed, the number of Sync that can be read by the read element RE at the time of demodulation tends to increase as the write width of the write element WE increases. FIG. 12 is a diagram illustrating how to decide a seek speed. In FIG. 12, the vertical axis represents the number of frames of the spiral width SP, and the horizontal axis represents the write width. When time of one frame length (Sync+ basic Dibit) is T (sec), a seek speed at the time of writing is V (m/sec), and a write width is $W_{WE}$ (nm), the number of frames F (count) of the spiral width is obtained by the following Formula 2.

$$F = (2 \times W_{WE} \times 10^{-9})/V/T \qquad \text{Formula 2}$$

For example, three types of seek speeds V1, V2, and V3 satisfying the following Formula 3 are prepared.

$$V1 < V2 < V3 \qquad \text{Formula 3}$$

At the relatively low seek speed V1, as indicated by a straight line L1 of a dashed line in FIG. 12, the number of Sync that can be read by the read element RE at the time of demodulation can linearly increase as the write width $W_{WE}$ of the write element WE increases.

At the relatively high seek speed V3, as indicated by a straight line L3 of a double-dashed line in FIG. 12, the write width $W_{WE}$ changes in a wider region, and as the write width $W_{WE}$ of the write element WE increases, the number of Sync that can be read by the read element RE at the time of demodulation can linearly increase.

At the medium seek speed V2, as indicated by a solid line L2 in FIG. 12, the write width $W_{WE}$ changes in a medium region, and as the write width $W_{WE}$ of the write element WE increases, the number of Sync that can be read by the read element RE at the time of demodulation can linearly increase.

In a case where the appropriate number of Sync is at the slice level or more, three types of write widths W1, W2, and W3 are prepared, which respectively correspond to intersections of the straight lines L1 to L3 and a straight line L0 indicating the slice level in FIG. 12 and satisfy the following Formula 4.

$$W1 < W2 < W3 \qquad \text{Formula 4}$$

Figure 13:
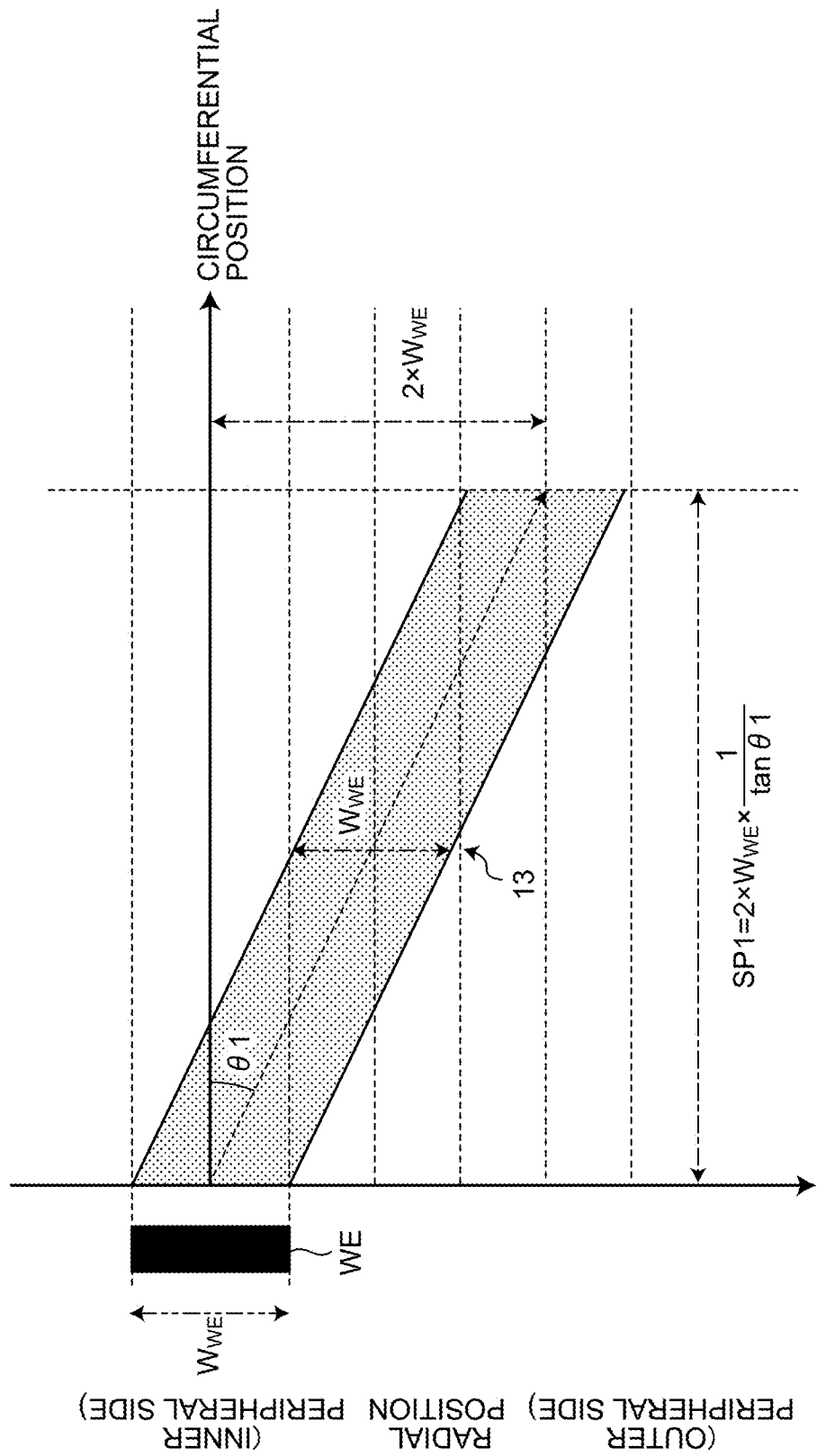
FIG. 13 is a diagram illustrating a spiral pattern to be written at a low seek speed according to the embodiment.

For the head HD having a relatively narrow write width $W_{WE}$ (e.g., W1≤$W_{WE}$<W2), the seek speed at the time of writing by the write element WE of the head HD is set to V1 that is relatively low as indicated by the dashed line in FIG. 12, and an inclination angle θ1 of the spiral pattern 13 with respect to the circumferential direction is reduced as illustrated in FIG. 13. A spiral width SP1 corresponding to twice the write width $W_{WE}$ satisfies the following Formula 5.

$$SP1 = 2 \times W_{WE} \times 1/(\tan\theta 1) \qquad \text{Formula 5}$$

As shown in Formula 5, in the case of the narrow write width $W_{WE}$, an appropriate length of the spiral width SP1 can be set by decreasing the inclination angle θ1. As a result, the number of Sync when the spiral pattern 13 is demodulated by the read element RE of the head HD can be increased (see FIG. 17) to enable improvement of a yield of the SSW step.

Figure 15:
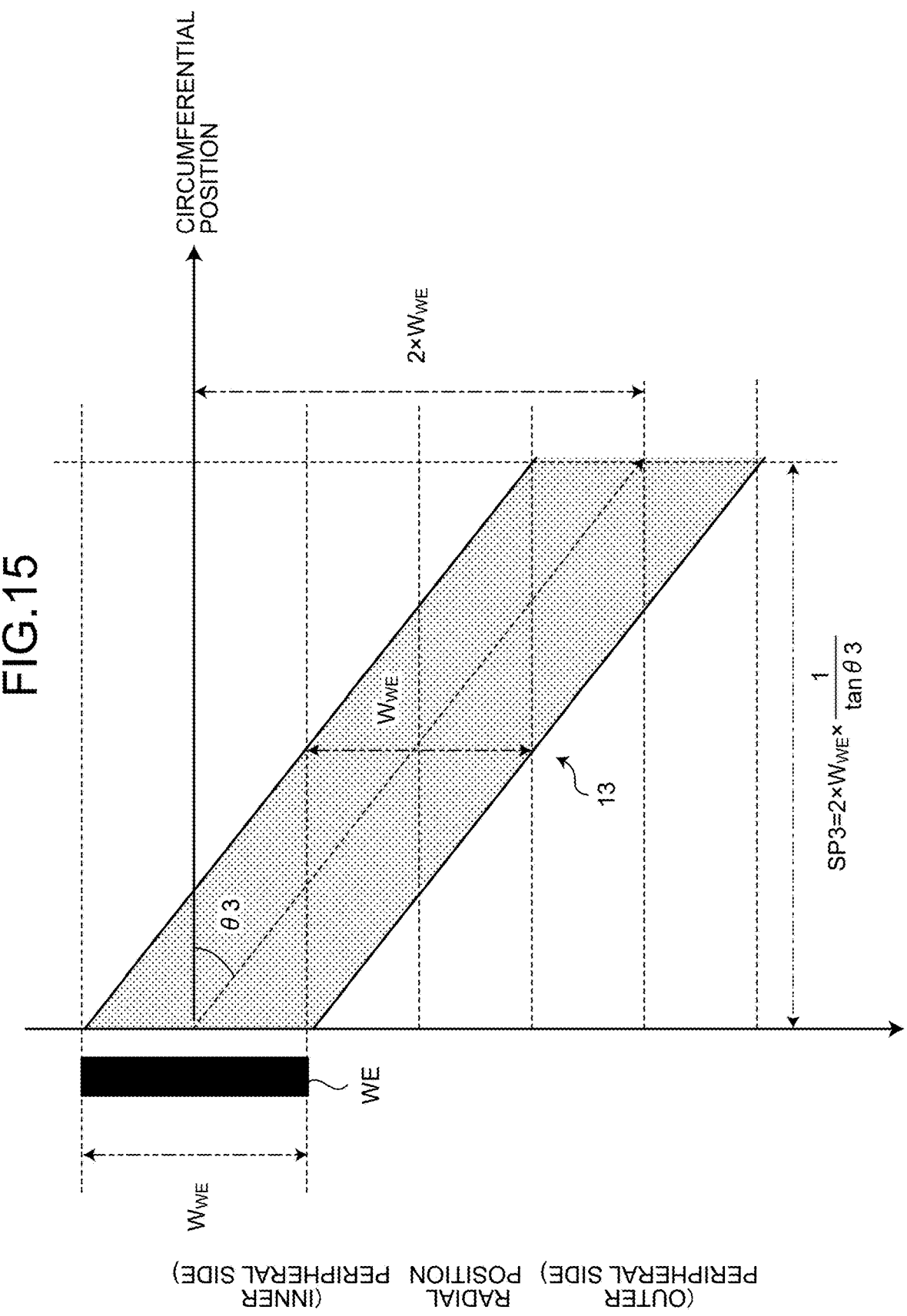
FIG. 15 is a diagram illustrating a spiral pattern to be written at a high seek speed according to the embodiment.

For the head HD having a relatively large write width $W_{WE}$ (e.g., W3≤$W_{WE}$), the seek speed at the time of writing by the write element WE of the head HD is set to V3 that is relatively high, and an inclination angle θ3 of the spiral pattern 13 with respect to the circumferential direction is increased as illustrated in FIG. 15. A spiral width SP3 corresponding to twice the write width $W_{WE}$ satisfies the following Formula 6.

$$SP3 = 2 \times W_{WE} \times 1/(\tan\theta 3) \qquad \text{Formula 6}$$

As shown in Formula 6, in the case of the large write width $W_{WE}$, an appropriate length of the spiral width SP3 can be set by increasing the inclination angle θ3. As a result, it is possible to suppress deterioration in positioning accuracy due to a decrease in the number of demodulatable spirals that occurs when the width in a time direction of the spiral pattern obtained by demodulating the spiral pattern 13 by the read element RE of the head HD is too large.

Figure 14:
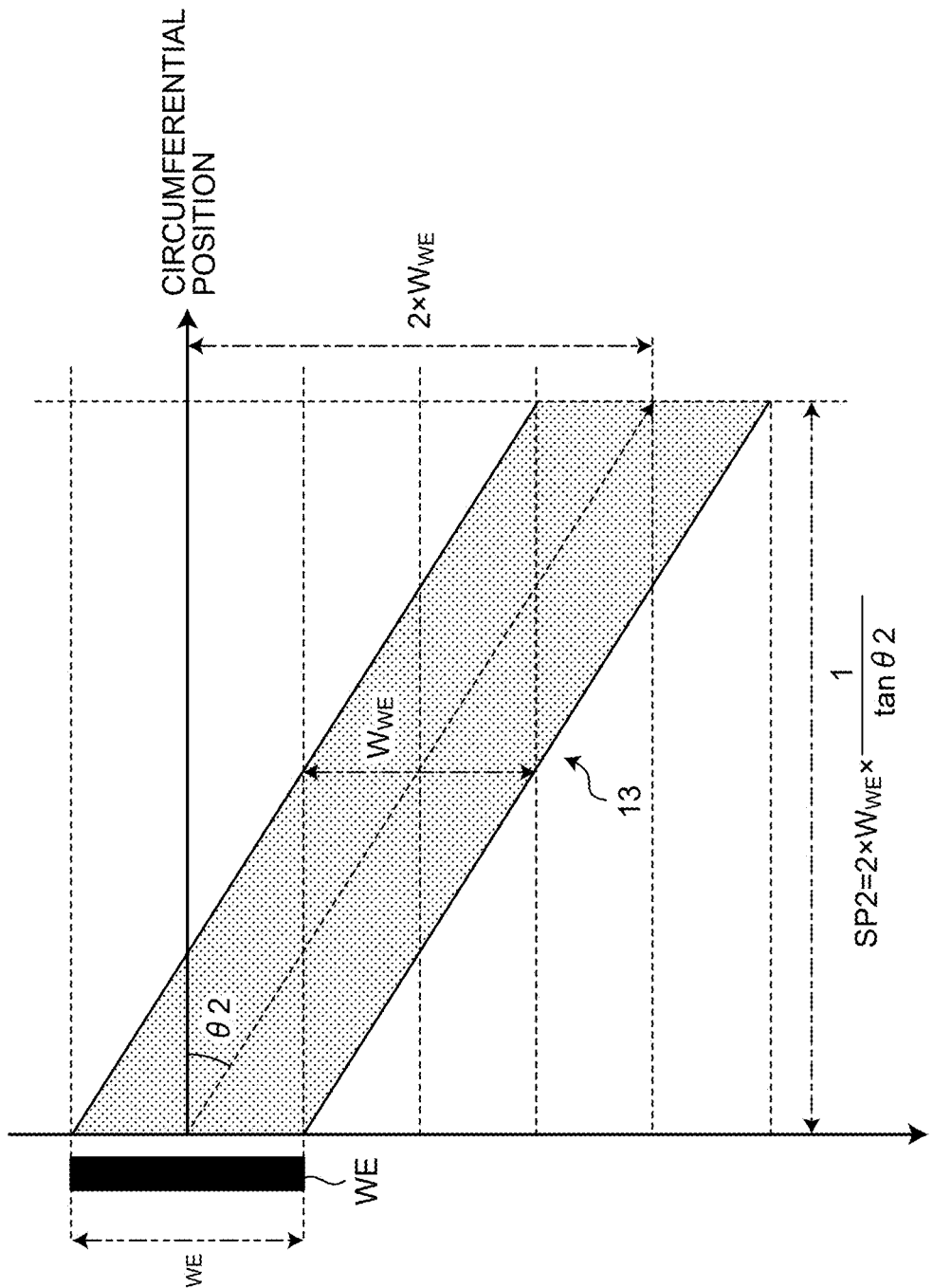
FIG. 14 is a diagram illustrating a spiral pattern to be written at a medium seek speed according to the embodiment.

For the head HD having a medium write width $W_{WE}$ (e.g., W2≤$W_{WE}$≤W3), the seek speed at the time of writing by the write element WE of the head HD is set to V2 that is medium, and an inclination angle θ2 of the spiral pattern 13 with respect to the circumferential direction is set to be medium as illustrated in FIG. 14. A spiral width SP2 corresponding to twice the write width $W_{WE}$ satisfies the following Formula 7.

$$SP2 = 2 \times W_{WE} \times 1/(\tan\theta 2) \qquad \text{Formula 7}$$

As shown in Formula 7, in the case of the medium write width $W_{WE}$, an appropriate length of the spiral width SP3 can be set by setting the inclination angle θ2 to be medium. As a result, an appropriate number of syncs can be secured, and the yield of the SSW step can be improved. In addition, deterioration of positioning accuracy due to a decrease in the number of demodulatable spirals can be suppressed.

Each of the spiral widths SP1 to SP3 illustrated in FIGS. 13 to 15 satisfies the following Formula 8.

$$SP1 \approx SP2 \approx SP3 \qquad \text{Formula 8}$$

The spiral widths SP1 to SP3 become almost the same by selecting the seek speeds V1 to V3 according to the write width $W_{WE}$ and setting the inclination angles θ1 to θ3.

Note that a head HD having an excessively narrow write width $W_{WE}$ (e.g., 0≤$W_{WE}$<W1) may be processed as an error. As a result, it is possible to avoid writing of the spiral pattern 13 having an insufficient number of Sync.

As illustrated in FIG. 12, a range for determining the write width $W_{WE}$ may be provided. A range WR1 satisfying W1≤$W_{WE}$<W2 is defined corresponding to a relatively narrow write width $W_{WE}$. A range WR2 satisfying W2<$W_{WE}$<W3 is defined corresponding to a medium write width $W_{WE}$. A range WR3 satisfying W3≤$W_{WE}$ is defined corresponding to a relatively large write width $W_{WE}$. A range WR0 satisfying 0≤$W_{WE}$<W1 is defined corresponding to a relatively narrow write width $W_{WE}$.

When the write width $W_{WE}$ measured in S15 is included in the range WR1, the disk device 1 selects the seek speed V1 among the multiple seek speeds V1 to V3. When the write width $W_{WE}$ measured in S15 is included in the range WR2, the disk device 1 selects the seek speed V2 among the multiple seek speeds V1 to V3. When the write width $W_{WE}$ measured in S15 is included in the range WR3, the disk device 1 selects the seek speed V3 among the multiple seek speeds V1 to V3. As a result, the seek speed can be appropriately adjusted according to the write width.

When the write width $W_{WE}$ measured in S15 is included in the range WR0, the disk device 1 may notify an error and end the processing.

In S16, the adjustment pattern 12 is erased. While tracking the guide spiral pattern 11, an offset is applied from the cylinder in which the adjustment pattern 12 is written, and an erasing pattern is written. The erasing pattern is set to be an AC erasing pattern having a frequency, for example, four times the basic Dibit of the adjustment pattern 12. A write range of the erasing pattern is, for example, ten rounds in the circumferential direction. In the radial direction, an offset is given from the written cylinder in increments of 0.5 tracks to write a range of ±2 cylinders, and erase almost the entire adjustment pattern.

Figure 16:
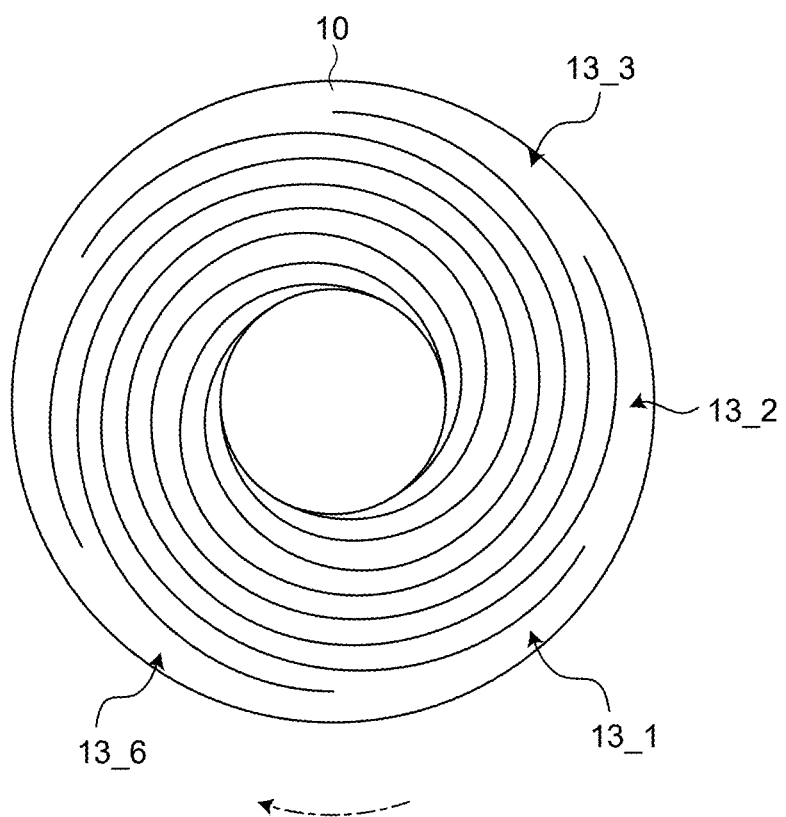
FIG. 16 is a diagram illustrating arrangement of a spiral pattern on the disk according to the embodiment.

Returning to FIG. 1, in the BDW step (S1), the guide spiral pattern 11 is tracked to write the spiral pattern 13 at the seek speed adjusted in S4 (S5). The disk device 1 may write multiple spiral patterns 13_1 to 13_6 as illustrated in FIG. 16 on the recording surface of the corresponding disk 10 by the head HD. FIG. 16 is a diagram illustrating arrangement of the spiral pattern 13 on the disk 10. In FIG. 16, the rotation direction of the disk 10 is indicated by a dashed line arrow. Each spiral pattern 13 spirally extends from the inner peripheral side to the outer peripheral side of the disk 10. Although FIG. 16 illustrates the case where the six spiral patterns 13_1 to 13_6 are written, the number of spiral patterns 13 may be one to five or seven or more.

The disk device 1 rotates the disk 10 at the predetermined rotation speed, and performs positioning-control of the head HD at a fifth position on the inner peripheral side according to information read from the guide spiral pattern 11_1. The disk device 1 causes the head HD to seek from the inner peripheral side to the outer peripheral side of the disk 10 at the seek speed of S4 while rotating the disk 10 at the predetermined rotation speed, thereby writing the control information IF2 with the write element WE. As a result, as illustrated in FIG. 16, the spiral pattern 13_1 is written on the disk 10.

The disk device 1 rotates the disk 10 at the predetermined rotation speed, and performs positioning-control of the head HD at a sixth position on the inner peripheral side according to the information read from the guide spiral pattern 11_1. The disk device 1 causes the head HD to seek from the inner peripheral side to the outer peripheral side of the disk 10 at the seek speed of S4 while rotating the disk 10 at the predetermined rotation speed, thereby writing the control information IF2 with the write element WE. As a result, as illustrated in FIG. 16, the spiral pattern 13_2 is written on the disk 10.

The disk device 1 rotates the disk 10 at the predetermined rotation speed, and performs positioning-control of the head HD at a seventh position on the inner peripheral side according to information read from the guide spiral pattern 11_2. The disk device 1 causes the head HD to seek from the inner peripheral side to the outer peripheral side of the disk 10 at the seek speed of S4 while rotating the disk 10 at the predetermined rotation speed, thereby writing the control information IF2 with the write element WE. As a result, as illustrated in FIG. 16, the spiral pattern 13_3 is written on the disk 10.

The disk device 1 rotates the disk 10 at the predetermined rotation speed, and performs positioning-control of the head HD at an eighth position on the inner peripheral side according to the information read from the guide spiral pattern 11_2. The disk device 1 causes the head HD to seek from the inner peripheral side to the outer peripheral side of the disk 10 at the seek speed of S4 while rotating the disk 10 at the predetermined rotation speed, thereby writing the control information IF2 with the write element WE. As a result, as illustrated in FIG. 16, the spiral pattern 13_4 is written on the disk 10.

The disk device 1 rotates the disk 10 at the predetermined rotation speed, and performs positioning-control of the head HD at a ninth position on the inner peripheral side according to information read from the guide spiral pattern 11_3. The disk device 1 causes the head HD to seek from the inner peripheral side to the outer peripheral side of the disk 10 at the seek speed of S4 while rotating the disk 10 at the predetermined rotation speed, thereby writing the control information IF2 with the write element WE. As a result, as illustrated in FIG. 16, the spiral pattern 13_5 is written on the disk 10.

The disk device 1 rotates the disk 10 at the predetermined rotation speed, and performs positioning-control of the head HD at a tenth position on the inner peripheral side according to the information read from the guide spiral pattern 11_3. The disk device 1 causes the head HD to seek from the inner peripheral side to the outer peripheral side of the disk 10 at the seek speed of S4 while rotating the disk 10 at the predetermined rotation speed, thereby writing the control information IF2 with the write element WE. As a result, as illustrated in FIG. 16, the spiral pattern 13_6 is written on the disk 10.

Figure 17:
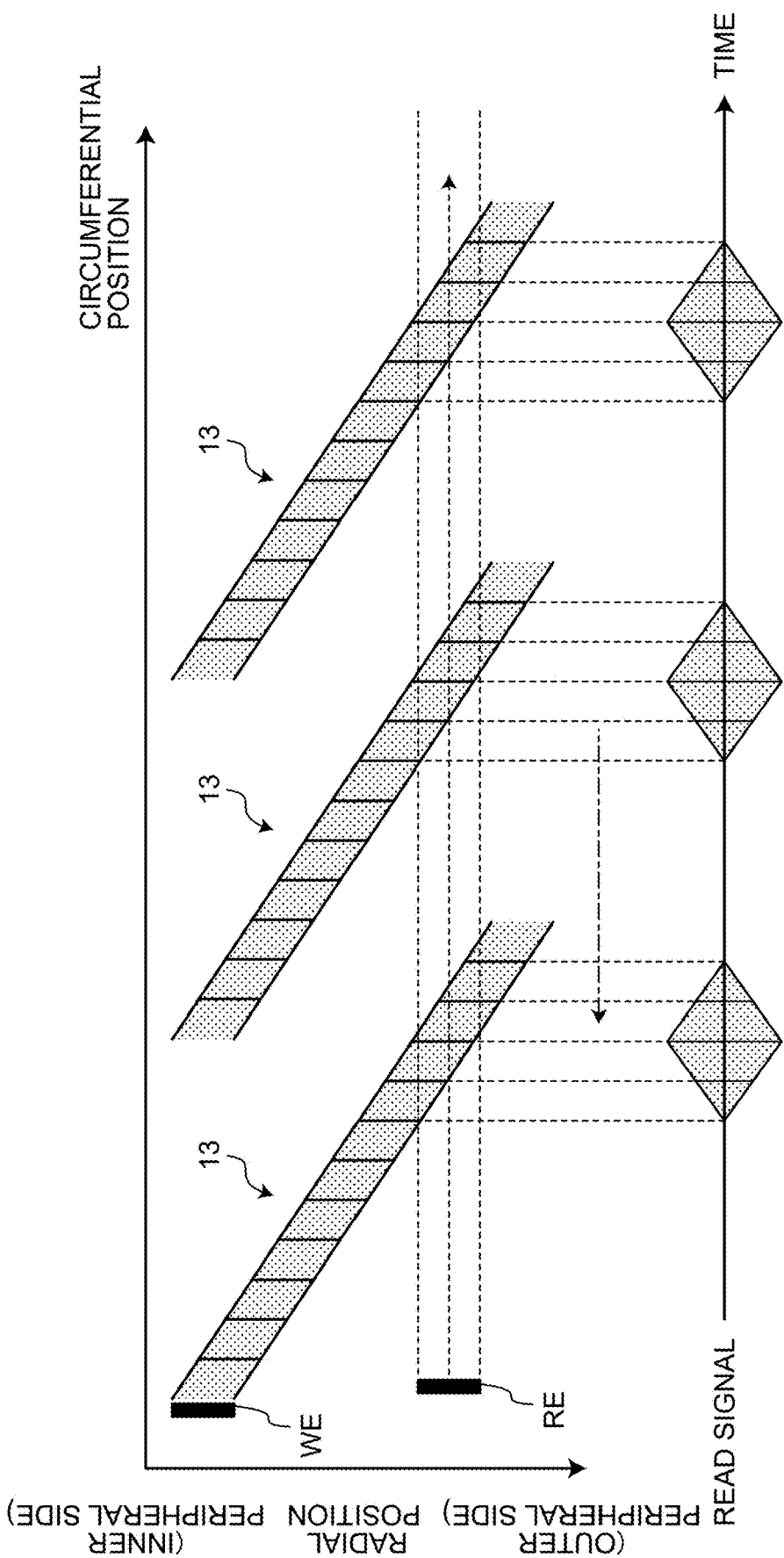
FIG. 17 is a diagram illustrating a read signal of the spiral pattern according to the embodiment.
Figure 18:
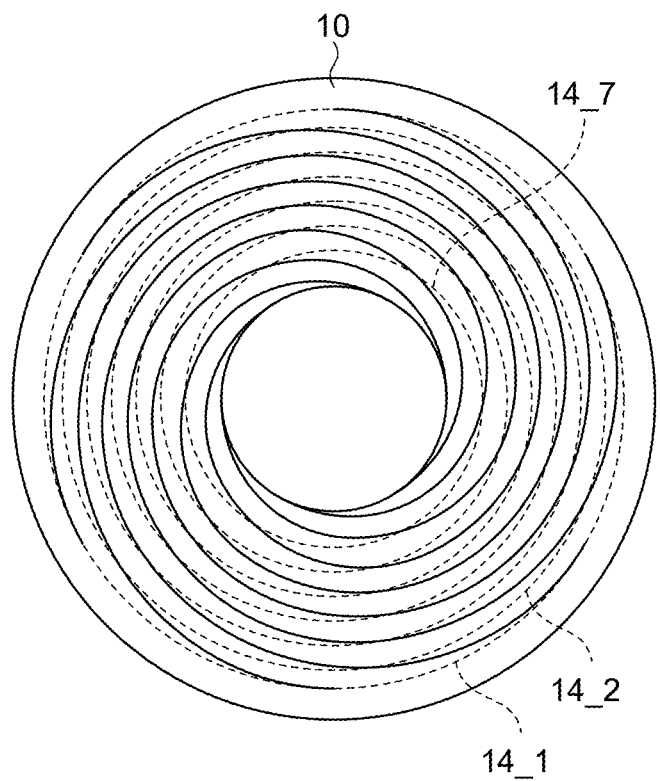
FIG. 18 is a diagram illustrating arrangement of a servo pattern on the disk according to the embodiment.

Returning to FIG. 1, in the SSW step (S2), the spiral pattern 13 is tracked to write a servo pattern 14 (S6). As illustrated in FIG. 17, the disk device 1 reads the spiral pattern 13 with the read element RE of the head HD, and performs positioning-control of the write element WE of the head HD at an eleventh position according to information read from the spiral pattern 13. FIG. 17 is a diagram illustrating a read signal of the spiral pattern 13. The disk device 1 writes servo patterns 14_1 to 14_7 distributed concentrically as indicated by a dotted line in FIG. 18 by the write element WE of the head HD while rotating the disk 10 at the predetermined rotation speed. FIG. 18 is a diagram illustrating arrangement of the servo pattern 14 on the disk 10. While FIG. 18 illustrates the case where the seven servo patterns 14_1 to 14_7 are written, the number of servo patterns 14 may be one to six or eight or more.

As a result, multiple concentric tracks are defined corresponding to the multiple servo patterns 14_1 to 14_7, and the disk device 1 on which the disk 10 including the multiple tracks is mounted is manufactured.

As described above, in the embodiment, in the disk device 1, information on a write width of the head HD is acquired, the seek speed of the head HD when writing the spiral pattern to the disk 10 is adjusted according to the write width, and the spiral pattern is written to the disk 10 at the adjusted seek speed. As a result, an inclination angle of the spiral pattern to be written with respect to the circumferential direction can be set to an appropriate angle according to the write width, thereby improving the manufacturing yield in the SSW step.

For example, for a head HD having a relatively narrow write width $W_{WE}$, the spiral width SP1 can be set to have an appropriate length by setting the seek speed at the time of writing to the relatively low V1 to decrease the inclination angle θ1. As a result, while securing an appropriate number of Sync, the number of Sync when the spiral pattern 13 is demodulated by the read element RE of the head HD can be increased (see FIG. 17) to enable improvement of the yield in the SSW step.

For a head HD having a relatively large write width $W_{WE}$, the spiral width SP3 can be set to have an appropriate length by setting the seek speed at the time of writing to the relatively high V3 to increase the inclination angle θ3. As a result, it is possible to suppress deterioration in positioning accuracy due to a decrease in the number of demodulatable spirals that occurs when the width in a time direction of the spiral pattern obtained by demodulating the spiral pattern 13 by the read element RE of the head HD is too large.

For a head HD having a medium write width $W_{WE}$, the spiral width SP3 can be set to have an appropriate length by setting the seek speed at the time of writing to the medium V2 to set the inclination angle θ2 to be medium. As a result, an appropriate number of syncs can be secured, and the yield of the SSW step can be improved. In addition, deterioration of positioning accuracy due to a decrease in the number of demodulatable spirals can be suppressed.

It should be noted that manufacturing information IF1 held by the rack terminal RT may include information on the write width of the head HD in association with identification information of the disk device 1. In this case, the disk device 1 may acquire the information on the write width of the head HD by receiving the information on the write width of the head HD from the rack terminal RT via a communication line.

Specifically, in the disk device 1 illustrated in FIG. 2, the HDC 37 can transmit an acquisition request for requesting acquisition of the information on the write width of the head HD to the rack terminal RT via the port PT, the pallet I/F 102, and the rack I/F 101. The acquisition request includes an effect of requesting acquisition of the identification information of the disk device 1 and the information on the write width of the head HD. Upon receiving the acquisition request, the rack terminal RT refers to the manufacturing information IF1 in response to the acquisition request, and extracts the information on the write width of the head HD from the manufacturing method IF1 using the identification information included in the acquisition request as a key. The rack terminal RT transmits the information on the write width of the head HD. When receiving the information on the write width of the head HD from the rack terminal RT via the rack I/F 101, the pallet I/F 102, and the port PT, the HDC 37 stores the information on the write width of the head HD in the nonvolatile memory 33.

In this case, in S4 of FIG. 1, instead of S11 to S14 of FIG. 5, the disk device 1 performs processing of receiving the information on the write width of the head HD from the rack terminal RT via the communication line, and then performs the processing of S15. Furthermore, the processing of S16 is omitted.

As a result, the seek speed adjustment processing (S4) can be simplified, and time required for manufacturing the disk device 1 can be shortened.

Alternatively, the write width of the head HD may change depending on a write condition. In this case, the disk device 1 may perform writing of the adjustment pattern 12 while changing the write condition, and select a combination of a write condition and a seek speed at which the number of detected Sync is appropriate.

Specifically, in S12 of FIG. 5, the disk device 1 writes multiple adjustment patterns 12 corresponding to multiple write conditions to the disk 10. In the multiple write conditions, overshoots of write currents may be different from each other. The overshoot represents a magnitude of a current amplitude swinging beyond an amplitude in a stable state (DC amplitude) in a waveform of a write current. The multiple adjustment patterns 12 may be written on different recording surfaces by different heads HD.

After S13 of FIG. 5 is performed similarly to the embodiment, the disk device 1 measures the readable offset range (=write width) for each of the multiple adjustment patterns 12 corresponding to the multiple write conditions in S14 of FIG. 5. The readable offset range can be also referred to as a radial position range in which the adjustment pattern 12 can be read. In S14, measurement results are obtained for multiple combinations of the write conditions and the seek speeds. The number of combinations is represented by (the number of write conditions)×(the number of seek speed types).

In S15 of FIG. 5, the disk device 1 selects a combination of a write condition and a seek speed among the multiple combinations, the combination enabling the spiral pattern 13 (see FIG. 16) to have a width enabling an appropriate number of syncs to be secured according to the size of the write width $W_{WE}$. The disk device 1 may select the highest seek speed at which the number of detected Sync is at the slice level or more among the multiple combinations.

As a result, the inclination angle of the spiral pattern to be written with respect to the circumferential direction can be set to an appropriate angle according to the write width and the write condition, and the manufacturing yield in the SSW step can be further improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a disk device, the method comprising:
    acquiring information on a write width of a head; and
    adjusting a seek speed of the head at a time of writing a spiral pattern to a disk by selecting a seek speed candidate from multiple seek speed candidates according to the acquired write width.

2. The method of manufacturing a disk device according to claim 1, wherein
    the acquiring information includes
    receiving the information on the write width of the head from a system that manages the disk device via a communication line.

3. The method of manufacturing a disk device according to claim 1, wherein
    the head includes a write element and a read element, and
    the acquiring information includes measuring the write width of the head.

4. The method of manufacturing a disk device according to claim 1, wherein
    the adjusting a seek speed includes:
    setting the seek speed of the head at the time of writing to a first speed in response to the acquired write width being a first write width; and
    setting the seek speed of the head at the time of writing to a second speed lower than the first speed in response to the acquired write width being a second write width narrower than the first write width.

5. The method of manufacturing a disk device according to claim 3, wherein
    the measuring includes:
    writing an adjustment pattern to the disk in a circumferential direction; and
    examining a position range in a radial direction in which the adjustment pattern can be read.

6. The method of manufacturing a disk device according to claim 5, wherein
    the adjustment pattern includes multiple sync marks, and
    the examining a position range includes
    while offsetting a second radial position of the head with respect to the disk from a track center, reading the adjustment pattern to obtain an offset range in which the number of the sync marks included in a read signal exceeds a first threshold value.

7. The method of manufacturing a disk device according to claim 6, wherein
    the adjusting a seek speed includes
    obtaining a width of the spiral pattern corresponding to a distance twice the offset range for each of multiple seek speed candidates, and selecting a seek speed at which the number of frames included in the width is larger than a second threshold value among the multiple seek speed candidates.

8. The method of manufacturing a disk device according to claim 7, wherein the selecting a seek speed candidate includes
selecting a highest seek speed from one or more seek speed candidates at which the number of frames included in the width is larger than the second threshold value among the multiple seek speed candidates.

9. The method of manufacturing a disk device according to claim 5, wherein
the measuring further includes
erasing the adjustment pattern.

10. The method of manufacturing a disk device according to claim 3, wherein
the measuring includes:
writing an adjustment pattern to the disk in a circumferential direction under multiple write conditions; and
examining a position range in a radial direction in which the adjustment pattern can be read for each of the multiple write conditions,
the examining a position range includes
while offsetting a second radial position of the head with respect to the disk from a track center, reading the adjustment pattern to obtain an offset range in which the number of sync marks included in a read signal exceeds a first threshold value for each of the multiple write conditions, and
the adjusting a seek speed includes
obtaining a width of the spiral pattern corresponding to a distance twice the offset range for each of multiple seek speed candidates, and selecting a combination of a seek speed and a write condition at which the number of frames included in the width is larger than a second threshold value among the multiple seek speed candidates.

11. A disk device comprising:
a disk;
an actuator that causes a head to seek the disk; and
a controller that acquires information on a write width of the head to adjust a seek speed of the head at a time of writing a spiral pattern to the disk according to the acquired write width.

12. The disk device according to claim 11, wherein
the controller
receives the information on the write width of the head from a system that manages the disk device via a communication line.

13. The disk device according to claim 11, wherein
the controller
measures the write width of the head to acquire the information.

14. The disk device according to claim 11, wherein
the controller
adjusts the seek speed by setting the seek speed of the head at the time of writing to a first speed in response to the acquired write width being a first write width, and setting the seek speed of the head at the time of writing to a second speed lower than the first speed in response to the acquired write width being a second write width narrower than the first write width.

15. The disk device according to claim 13, wherein
the controller
measures the write width of the head by writing an adjustment pattern to the disk in a circumferential direction, and examining a position range in a radial direction in which the adjustment pattern can be read.

16. The disk device according to claim 15, wherein
the adjustment pattern includes multiple sync marks, and
the controller
examines the position range by reading the adjustment pattern while offsetting a second radial position of the head with respect to the disk from a track center, and obtaining an offset range in which the number of the sync marks included in a read signal exceeds a first threshold value.

17. The disk device according to claim 16, wherein
the controller
adjusts the seek speed by obtaining a width of the spiral pattern corresponding to a distance twice the offset range for each of multiple seek speed candidates, selecting a seek speed candidate at which the number of frames included in the width is larger than a second threshold value among the multiple seek speed candidates, and setting the selected seek speed candidate as a seek speed.

18. The disk device according to claim 17, wherein
the controller
selects the seek speed candidate by selecting a highest seek speed candidate from one or more seek speed candidates at which the number of frames included in the width is larger than the second threshold value among the multiple seek speed candidates, and setting the selected seek speed candidate as a seek speed.

19. The disk device according to claim 15, wherein
the controller erases the adjustment pattern.

20. The disk device according to claim 13, wherein
the controller:
measures the write width of the head by writing an adjustment pattern to the disk in a circumferential direction under multiple write conditions, and examining a position range in a radial direction in which the adjustment pattern can be read for each of the multiple write conditions;
examines the position range by reading the adjustment pattern while offsetting a second radial position of the head with respect to the disk from a track center, and obtaining an offset range in which the number of sync marks included in a read signal exceeds a first threshold value for each of the multiple write conditions; and
obtains a width of the spiral pattern corresponding to a distance twice the offset range for each of multiple seek speed candidates, and selects a combination of a seek speed and a write condition at which the number of frames included in the width is larger than a second threshold value among the multiple seek speed candidates.

* * * * *